(12) United States Patent
Kranitzky et al.

(10) Patent No.: US 9,942,524 B2
(45) Date of Patent: Apr. 10, 2018

(54) DEVICE AND METHOD FOR DETECTING THE POSITION OF AN OBJECT IN A MACHINE TOOL

(75) Inventors: Walter Kranitzky, Traunstein (DE); Martin Schilcher, Traunwalchen (DE); Gerhard Muehlbauer, Freilassing (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 992 days.

(21) Appl. No.: 13/979,181

(22) PCT Filed: Nov. 10, 2011

(86) PCT No.: PCT/EP2011/069839
§ 371 (c)(1),
(2), (4) Date: Jul. 11, 2013

(87) PCT Pub. No.: WO2012/095199
PCT Pub. Date: Jul. 19, 2012

(65) Prior Publication Data
US 2013/0278751 A1    Oct. 24, 2013

(30) Foreign Application Priority Data
Jan. 13, 2011    (DE) .................. 10 2011 002 625

(51) Int. Cl.
*H04N 7/18*    (2006.01)
*G06T 7/73*    (2017.01)

(52) U.S. Cl.
CPC .............. *H04N 7/183* (2013.01); *G06T 7/75* (2017.01); *G06T 2207/30164* (2013.01)

(58) Field of Classification Search
CPC .. H04N 7/183; G06T 7/75; G06T 2207/30164
See application file for complete search history.

(56) References Cited

U.S. PATENT DOCUMENTS 5,208,763 A * 5/1993 Hong ................... G05B 19/402
                                                                700/192
7,218,995 B2    5/2007 Jahn et al.
(Continued)

FOREIGN PATENT DOCUMENTS

DE    102005022344 A1    11/2006
DE    112007001977 T5    7/2009
(Continued)

OTHER PUBLICATIONS

Lipiello et al., "Position-Based Visual Servoing in Industrial Multirobot Cells Using a Hybrid Camera Configuration," IEEE Transactions on Robotics, Vo. 23, No. 1, Feb. 2007, pp. 73-86.*
(Continued)

*Primary Examiner* — Thai Tran
*Assistant Examiner* — Christopher T Braniff
(74) *Attorney, Agent, or Firm* — Leydig, Voit & Mayer, Ltd.

(57) ABSTRACT

A device for detecting the position of an object in a machine tool includes a camera configured to provide an image of the object and an object carrier to which the object is connected and whose position within the machine tool is known. A first processing unit is configured to identify a position of the object relative to the camera based on geometric features of the object which are obtained from the image. A second processing unit is configured to identify a position of the object carrier relative to the camera based on geometric features of the object carrier which are obtained from the image. A third processing unit is configured to determine a position of the object relative to the object carrier from the identified positions of the object and the object carrier relative to the camera.

15 Claims, 2 Drawing Sheets

(56) References Cited

U.S. PATENT DOCUMENTS

| | | | |
|---|---|---|---|
| 7,280,687 B2* | 10/2007 | Ban | G06T 7/0046 |
| | | | 345/419 |
| 8,310,534 B2 | 11/2012 | Tian et al. | |
| 8,335,666 B2 | 12/2012 | Tian et al. | |
| 2006/0259180 A1 | 11/2006 | Jahn et al. | |
| 2009/0015668 A1* | 1/2009 | Tian | G06T 7/0075 |
| | | | 348/92 |

FOREIGN PATENT DOCUMENTS

| | | | |
|---|---|---|---|
| JP | 61219554 A | 9/1986 | |
| JP | 11121992 A | 4/1999 | |
| JP | 2004191335 A | 7/2004 | |
| JP | 20049293 A | 7/2005 | |

OTHER PUBLICATIONS

Vincenzo Lippiello et al. "Position-Based Visual Servoing in Industrial Multirobot Cells Using a Hybrid Camera Condiguration" IEEE Transactions on Robotics. vol. 23, No. 1, Feb. 2007.

Tae S. Jin et al. "Pose Determination of a Mobile-Task Robot Using an Active Calibration Scheme" Industrial Electronics, 2002 IEEE International Symposium on Jul. 8, 2002.

Gonzalez-Galvan E. J. et al. ,,An Efficienc Multi-Camera: Multi-Target Scheme for the Three-Dimensional Control of Robots Using Unalibrated Vsision, Robotics and Computer Integrated Manufacturing, Elsevier Science Oublishers: vol. 19, No. 5, Oct. 1, 2003, pp. 387-400.

\* cited by examiner

DEVICE AND METHOD FOR DETECTING THE POSITION OF AN OBJECT IN A MACHINE TOOL

CROSS-REFERENCE TO PRIOR APPLICATIONS

This application is a U.S. National Phase application under 35 U.S.C. § 371 of International Application No. PCT/EP2011/069839, filed on Nov. 10, 2011, and claims benefit to German Patent Application No. DE 10 2011 002 625.8, filed on Jan. 13, 2011. The International Application was published in German on Jul. 19, 2012 as WO 2012/095199 under PCT Article 21(2).

FIELD

The present invention relates to a device and a method for detecting the position of an object in a machine tool. Such methods are required, for example, for determining the exact position of a workpiece within the machine tool after the workpiece has been mounted. Knowing this position is decisive for accurate processing of the workpiece and, for example, also for collision control. For this purpose, it is necessary to determine not only the position of workpiece, but also the positions of the clamping devices that are used for mounting the workpiece.

BACKGROUND

Since the clamping and setting up of a workpiece in a machine tool often makes up a considerable part of the machining time, it is advantageous if the exact positions of the workpiece and its clamping devices can be detected as fast as possible. Various devices and methods have already been proposed for this purpose which use cameras for detecting the clamping condition.

German Patent Document DE 11 2007 001 977 T5, for example, describes a method which extracts a model of a workpiece from a camera image of the workpiece. The techniques used for this purpose, such as detection of edges, are described in detail. The model is then compared to known objects to identify the particular object present. The position and orientation of the object are later determined from the camera image and used, for example, for collision control.

German Patent Document DE 10 2005 022 344 A1 also describes a method which allows the position of a workpiece to be determined, at least roughly, from geometrical parameters which are obtained from a camera image and reconciled with a model of the workpiece. The information so obtained is either used as a starting position for an even more accurate measurement using a tactile sensor, or used directly to determine a matrix which describes a displacement and/or a rotation of the workpiece relative to a reference point of the machine tool. This allows accurate machining of the workpiece even when the actual clamping condition does not exactly match the clamping condition expected by the NC program.

SUMMARY

In an embodiment, the present invention provides a device for detecting the position of an object in a machine tool. A camera is configured to provide an image of the object and an object carrier to which the object is connected and whose position within the machine tool is known. A first processing unit is configured to identify a position of the object relative to the camera based on geometric features of the object which are obtained from the image. A second processing unit is configured to identify a position of the object carrier relative to the camera based on geometric features of the object carrier which are obtained from the image. A third processing unit is configured to determine a position of the object relative to the object carrier from the identified positions of the object and the object carrier relative to the camera.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
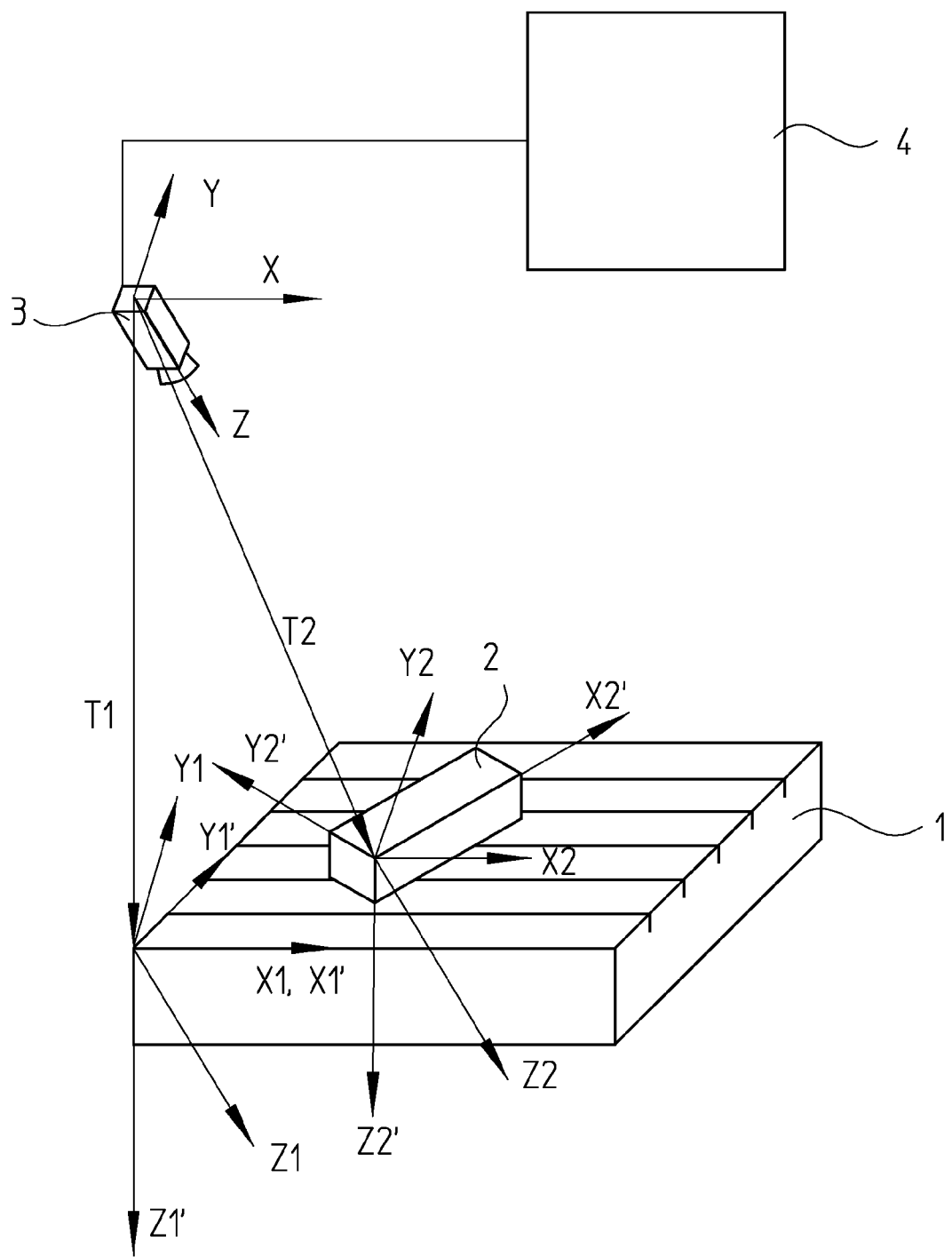
FIG. 1 is a view of a portion of a machine tool, showing the relative positions between the camera and the workpiece and between the camera and the work table.

The present invention recognizes a disadvantage of the methods of the prior art described above is that in addition to an intrinsic calibration of the camera, whereby the optical parameters of the camera are determined in order to be taken into account later, they also require an extrinsic calibration to determine the position and orientation of the camera. In contrast to the intrinsic calibration, this extrinsic calibration must be repeated often, and in some cases, each time before a measurement is made, unless the camera is mounted in a completely fixed relationship to the coordinate system of the machine tool. This requires great effort either for the mounting of the camera, or for the regular external calibration of the camera.

In various embodiments, the present invention provides a device and method which will provide a simplified way of determining the position of an object within a machine tool using a camera and which will reduce the effort required to mount and calibrate the camera.

For this purpose, a camera is used which provides an image of the object and an object carrier to which the object is connected and whose position within the machine tool is known. A first processing unit allows the position of the object relative to the camera to be identified based on geometric features of the object which are obtained from the image. A second processing unit allows the position of the object carrier relative to the camera to be identified based on geometric features of the object carrier which are obtained from the image. Finally, a third processing unit serves to determine the relative position between the object carrier and the object from the relative positions between the camera and the object and between the camera and the object carrier.

This eliminates the need for extrinsic calibration of the camera, because the position and orientation of the camera are rendered irrelevant by arithmetically combining the relative positions. It is merely required that sufficiently large portions of the object and the object carrier be discernible in the camera image in order to allow automatic recognition. Thus, even if the camera is mounted in a location where it is moved by mechanical or thermal influences, the respective determined relative position between the object and the object carrier will not change. Accordingly, for example, a wall bounding the inner space of the machine tool may serve as a mounting location for the camera even if this wall is a simple sheet-metal cover which bends relatively easily, and thereby may, in particular, significantly change the orientation of the camera.

The object carrier may be the work table on which the object (e.g., a workpiece or a clamping device) is directly disposed. Such work tables often have very characteristic and well-defined patterns formed by T-grooves or drilled holes, the edges of which are readily recognizable in the image of the camera. Therefore, these patterns are well suited for automated image processing.

However, a different component of the machine tool, whose position within the machine tool is known and which is connected to the work table in a defined manner, may also serve as an object carrier according to an embodiment of the present invention. Thus, for example, a bridge carrying the work table could be used as an object carrier according to an embodiment of the present invention, or any other distinctive structure of the machine tool, provided that its position is known and that it is connected to the work table in a defined manner.

The object may be a workpiece that is to be machined by a tool of the machine tool. To this end, the tool is moved relative to the workpiece along paths previously defined in an NC program, and removes material from the workpiece in the process. However, the object may also be a clamping device for holding the workpiece, such as, for example, a vise.

The position between the tool and the workpiece is often defined from the tool center point (TCP) by the so-called "kinematic chain", which takes into account the geometry of the machine tool as well as the location of each axis of the machine tool. Thus, in a 5-axes milling machine, the location of the tool in terms of position and orientation relative to the work table is at all times defined by the kinematic chain. The measurement of a newly mounted workpiece ultimately serves to also integrate this workpiece into the kinematic chain in order to allow the tool to be positioned and moved relative to the workpiece in the manner defined in the NC program. To this end, it suffices to determine the position and orientation of the workpiece relative to any desired point of the already known kinematic chain, since this point is related in a defined manner to the surface of the work table. Therefore, in the context of the present invention, the term "object carrier" is to be understood as that region of the machine tool whose position and orientation relative to the workpiece are already known, such as, for example, all components of the kinematic chain of the machine tool.

In order to mount a workpiece on the work table, a clamping device is needed which, although they are not machined, nevertheless need to be taken into account for purposes of collision control, for example. Therefore, these clamping devices are also to be considered as objects whose position and orientation in the kinematic chain of the machine tool must be determined. Accordingly, clamping devices and workpieces are objects in accordance with embodiments of the present invention.

Both the object and the object carrier must be known in terms of shape and size to be able to infer the respective relative position from the camera image. Therefore, the processing units have access to memory areas in which such geometric information of the particular object and object carrier is stored.

FIG. 1 shows a portion of a machine tool. There is shown an object carrier in the form of a work table 1, on which is disposed an object in the form of a workpiece 2.

A camera 3, which may be attached to, for example, the housing of the machine tool, provides an image showing both work table 1 and workpiece 2, or at least a portion thereof sufficiently large to allow the position and orientation of work table 1 and workpiece 2 to be determined therefrom in an automated fashion.

This image is transmitted to a control system 4, which handles at least the execution of the method of an embodiment of the present invention. The control system is preferably a numerical control system, which also performs all other control operations on the machine tool, such as the execution of an NC program.

Camera 3 is assumed to have a position defined by the origin of coordinate system X-Y-Z and an orientation defined by coordinate axes X, Y, and Z. Without limiting generality, the direction of view of camera 3, for example, may define the Z-axis of the coordinate system of camera 3.

Work table 1 is assumed to have a position defined by the origin of coordinate system X1'-Y1'-Z1' and an orientation defined by coordinate axes X1', Y1', Z1'. Without limiting generality, a perpendicular dropped onto table 1, for example, may define the Z1' axis of the coordinate system of table 1. The edges of the table define the other coordinate axes X1' and Y1'. The origin is located at a corner of table 1.

Workpiece 2 is assumed to have a position defined by the origin of coordinate system X2'-Y2'-Z2' and an orientation defined by coordinate axes X2', Y2', Z2'. Without limiting generality, the edges of block-shaped workpiece 2 define the directions of coordinate axes X2', Y2', Z2' of workpiece 2.

The coordinate systems of work table 1, workpiece 2 and camera 3 in FIG. 1 may also be selected completely differently and based on practical aspects alone. For differently shaped tables 1 and workpieces 2, other coordinate systems may be better suited in terms of a simpler representation of positions and orientations.

In a first step, a first processing unit in control system 4 determines the position of workpiece 2 relative to camera 3 using image analysis methods, such as are known, inter alia, from the prior art cited. This is indicated in FIG. 1 by a translation vector T2 from the origin of camera 3 to the origin of workpiece 2, and by coordinate axes X2, Y2, Z2, which are parallel to coordinate axes X, Y, Z of camera 3. The displacement and rotation of workpiece 2 relative to camera 3 are determined by translation vector T2 and a rotation matrix D2 which transforms coordinate system X2'-Y2'-Z2' into coordinate system X2-Y2-Z2. T2 and D2 can also be combined into a homogeneous transformation H2=[D2 I T2] by extending rotation matrix D2 by an additional column to receive the components of translation vector T2. This homogeneous transformation H2 contains the complete information about the displacement and rotation between camera 3 and workpiece 2.

To this end, the first processing unit, which is preferably implemented as a software algorithm in control system 4, accesses a memory area in which is stored geometric information, such as the shape and size, of possible objects; i.e., of possible workpieces 2, or also of clamping devices. The particular object and its position relative to camera 3 can be inferred through reconciliation of the stored information with the information obtained from the camera image in conjunction with the intrinsic calibration of camera 3.

In a second step, a second processing unit in control system 4 then determines the position of table 1 relative to camera 3. This is indicated in FIG. 1 by a translation vector T1 from the origin of camera 3 to the origin of table 1, and by coordinate axes X1, Y1, Z1, which are parallel to coordinate axes X, Y, Z of the camera. The displacement and rotation of table 1 relative to camera 3 are determined by translation vector T1 and a rotation matrix D1 which transforms coordinate system X1'-Y1'-Z1' into coordinate system X1-Y1-Z1. T1 and D1 can also be combined into a homogeneous transformation H1=[D1 I T1] by extending rotation matrix D1 by an additional column to receive the components of translation vector T1. This homogeneous transformation H1 contains the complete information about the displacement and rotation between camera 3 and work table 1.

To this end, the second processing unit, which is preferably also implemented as a software algorithm in control system 4, accesses a memory area that contains geometric information of table 1. The position of table 1 relative to camera 3 can be inferred through reconciliation of the stored information with the information obtained from the camera image in conjunction with the intrinsic calibration of camera 3.

The order of the first and second steps may, of course, be reversed. Moreover, the first and second steps may also be performed simultaneously, provided that this is made possible, for example, by image analysis algorithms executed in parallel in control system 4.

Figure 2:
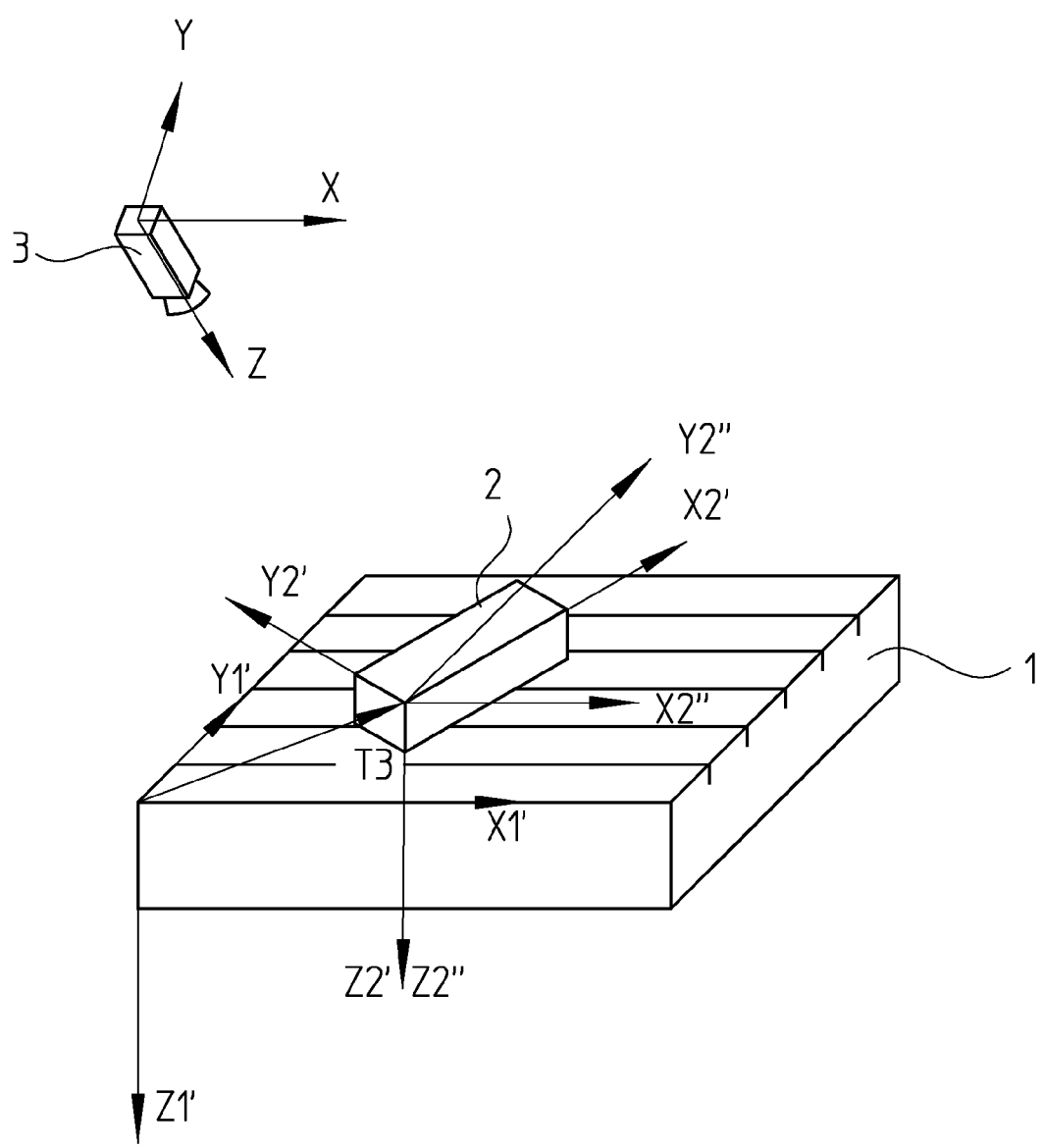
FIG. 2 is a view of a portion of a machine tool, showing the relative position between the workpiece and the work table.

In a third step, the relative position between workpiece 2 and work table 1 is then determined by arithmetically combining the relative positions between camera 3 and workpiece 2 and between camera 3 and work table 1. This can be performed by a third processing unit, which like the first and second processing units, can be implemented as a software algorithm in the control system 4. Translation vector T3, which is shown in FIG. 2 and which represents the offset between the origin of table 1 and the origin of workpiece 2 in terms of magnitude and direction, is obtained by subtracting the previously determined translation vector T1 from the also previously determined translation vector T2. The position and orientation of camera 3 are irrelevant for the result.

Similarly, the rotation between table 1 and workpiece 2 is inferred from the rotation between camera 3 and table 1, which is described by rotation matrix D1, and the rotation between camera 3 and workpiece 2, which is described by rotation matrix D2. In other words, a rotation matrix D3 is determined which transforms coordinate system X2'-Y2'-Z2' of workpiece 2 into coordinate system X2"-Y2"-Z2" and thereby aligns it parallel to coordinate system X1'-Y1'-Z1' of table 1. To this end, inverse rotation matrix $D1^{-1}$ must be multiplied by rotation matrix D2; i.e., $D3=D1^{-1}*D2$. This rotation matrix D3 and translation vector T3, which together transform coordinate system X1'-Y1'-Y2' into coordinate system X2'-Y2'-Z2', contain the sought information about the position and orientation of workpiece 2 relative to work table 1. Alternatively, it is also possible to calculate a homogeneous transformation $H3=H1^{-1}*H2$ that describes the displacement and rotation between work table 1 and workpiece 2 in a matrix. What is important is that T3 and D3 and H3, respectively, are independent of the orientation of camera 3 and, thus, no extrinsic calibration of the camera is needed.

Thus, workpiece 2 and also the clamping device thereof can be integrated into the kinematic chain of the machine tool and taken into account for purposes of collision control, for example, even though the exact position of the camera is not known and may change between one measurement and the next.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" should be interpreted as including any singular entity from the listed elements, e.g., A, any subset from the listed elements, e.g., A and B, or the entire list of elements A, B and C.

What is claimed is:

1. A device for detecting the position of an object in a machine tool, the device comprising:
   a camera configured to provide an image of the object and an object carrier to which the object is connected and whose position within the machine tool is known;
   a first processing unit configured to identify a position of the object relative to the camera based on geometric features of the object which are obtained from the image;
   a second processing unit configured to identify a position of the object carrier relative to the camera based on geometric features of the object carrier which are obtained from the image; and
   a third processing unit configured to determine a position of the object relative to the object carrier from the identified positions of the object and the object carrier relative to the camera.

2. The device as recited in claim 1, wherein the object is a workpiece to be machined or a clamping device for fixing a workpiece on a work carrier.

3. The device as recited in claim 1, wherein the first processing unit includes a memory area having geometric information of different objects stored therein.

4. The device as recited in claim 3, wherein the geometric information is stored in the form of at least one of computer-aided design (CAD) model and a camera image.

5. The device as recited in claim 3, wherein the first processing unit is configured to identify the object shown in the image of the camera based on the geometric information stored in the memory area.

6. The device as recited in claim 1, wherein the second processing unit includes a memory area having geometric information of the object carrier stored therein.

7. The device as recited in claim 6, wherein the geometric information is stored in the form of at least one of computer-aided design (CAD) model and a camera image.

8. The device as recited in claim 1, wherein the object carrier forms part of a kinematic chain of the machine tool such that the position of the object carrier with respect to the machine tool is known in a higher-level control system.

9. The device as recited in claim 8, wherein the camera is attached to a part of the machine tool that does not form part of the kinematic chain of the machine tool such that a position of the camera relative to components of the kinematic chain is undefined.

10. The device as recited in claim 1, wherein the third processing unit is configured to determine the position of the object relative to the object carrier by arithmetically combining the determined positions of the object and the object carrier relative to the camera.

11. A method for detecting the position of an object in a machine tool, the method comprising:
   capturing, using a camera, an image of the object and an object carrier to which the object is connected and whose position within the machine tool is known;
   determining a position of the object relative to the camera based on geometric features of the object obtained from the image;
   determining a position of the object carrier relative to the camera based on geometric features of the object carrier obtained from the image; and
   determining a position of the object relative to the object carrier from the determined positions of the object and the object carrier relative to the camera.

12. The method as recited in claim 11, wherein the first determining step is performed by a first processing unit, the second determining step is performed by a second processing unit and the third determining step is performed by a third processing unit.

13. The method as recited in claim 11, wherein the determining the position of the object relative to the camera includes using a first processing unit to compare the geometric information of the object obtained from the image to geometric information of possible objects stored in a library and identifying one of the possible objects upon the comparison resulting in a sufficient match.

14. The method as recited in claim 11, wherein the object carrier forms part of a kinematic chain of the machine tool such that the position of the object tool with respect to the machine tool is known in a higher-level control system, the method further comprising, after the determining the position of the object relative to the object carrier, making the object itself a part of the kinematic chain of the machine tool such that the position of the object is known in the higher-level control system.

15. The method as recited in claim 11, wherein the position of the object relative to the object carrier is determined by arithmetically combining the determined positions of the object and the object carrier relative to the camera.

* * * * *